No. 724,640. PATENTED APR. 7, 1903.
J. W. WHITLOCK.
CREAM SEPARATOR.
APPLICATION FILED JAN. 10, 1903.
NO MODEL.
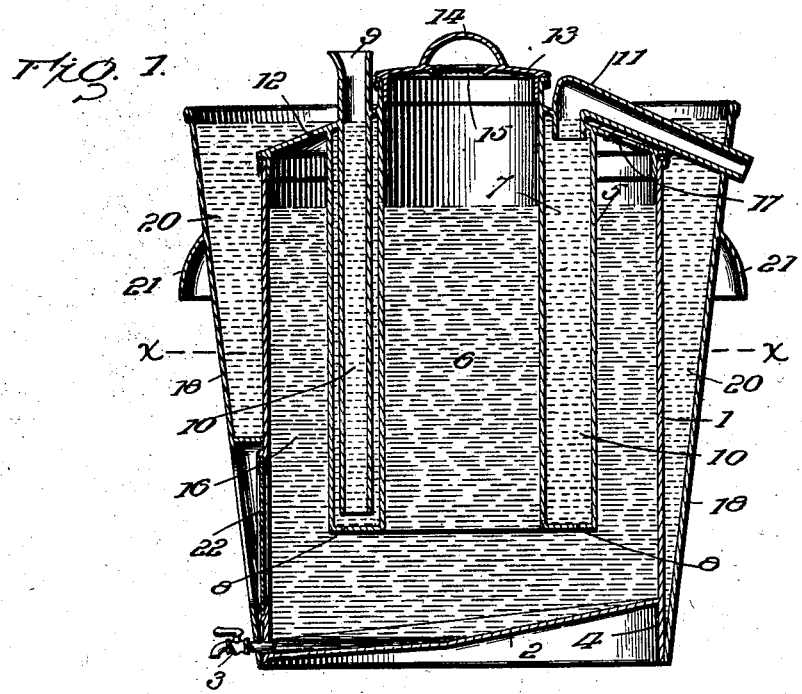
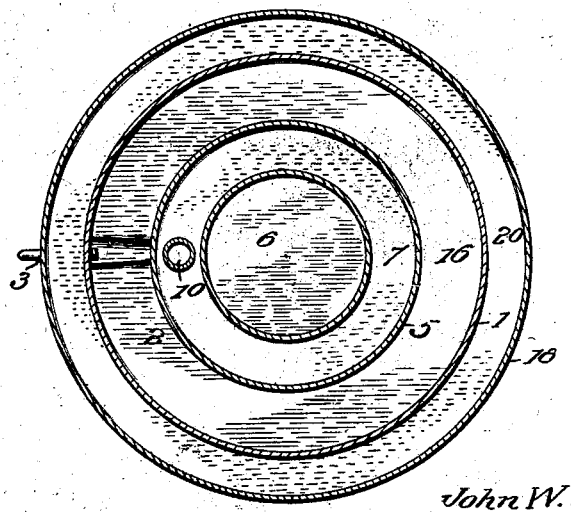
Witnesses
Inventor
John W. Whitlock
By Attorneys

UNITED STATES PATENT OFFICE.

JOHN W. WHITLOCK, OF LIBERTYVILLE, IOWA.

CREAM-SEPARATOR.

SPECIFICATION forming part of Letters Patent No. 724,640, dated April 7, 1903.

Application filed January 10, 1903. Serial No. 138,553. (No model.)

*To all whom it may concern:*

Be it known that I, JOHN W. WHITLOCK, a citizen of the United States, residing at Libertyville, in the county of Jefferson and State of Iowa, have invented certain new and useful Improvements in Cream-Separators; and I do hereby declare the following to be a full, clear, and exact description of the invention, such as will enable others skilled in the art to which it appertains to make and use the same.

My invention relates to milk-coolers or cream-separators; and it consists of certain novel features of combination and construction of parts, the preferred form whereof will be hereinafter clearly set forth, and pointed out in the claim.

The prime object of my invention is to provide a cream-separator which will be found very reliable and efficient in the performance of its office of separating the cream from the milk in the shortest possible time.

Other objects and advantages will be hereinafter made clearly apparent, reference being had to the accompanying drawings, which are made a part of this application, and in which—

Figure 1 is a vertical longitudinal section of my invention complete, taken on the median line. Fig. 2 is a horizontal section of my separator and outer jacket as taken on line x x of Fig. 1.

In order to conveniently refer to the various details of my invention and accessories required to coöperate therewith, numerals will be employed, the same numeral referring to a similar part throughout the several views.

In carrying out my invention I provide the body portion 1 of my cream-separator, which may be made of any preferred size and shape and is preferably provided with the bottom section 2 so provided with a centrally-disposed depression or groove as to direct or feed the milk within the casing 1 to one side of and deliver the same through the faucet 3 or other means employed to withdraw the skimmed milk after the cream has separated therefrom. I prefer also to so locate the bottom section 2 that it will be slightly above the free lower edge of the body-section 1, the extension of said lower edge being indicated by the numeral 4 in Fig. 1. Within the body portion or exterior casing 1 thus constructed I dispose the exterior casing 5 concentric with the outer casing, said exterior casing 5 being annularly disposed around the inner casing 6, also concentrically disposed with respect to the body portion 1. The walls of the interior casing 5 and the inner casing 6 are therefore disposed parallel with each other, thereby providing an annular chamber 7, entirely surrounding the chamber 6, the bottom 8 of the annular chamber 7 being connected to the lower edge of the inner chamber 6 and the wall of the interior casing 5, thus forming a water-tight compartment annularly disposed entirely around the chamber 6, such annular space or chamber being indicated by the numeral 7, as above set forth.

The annular chamber 7 is designed for the reception of water which is introduced through the funnel-shaped receiving-orifice 9, said orifice being a continuation of the pipe 10, which extends downward in the annular chamber 7 nearly to the bottom thereof, whereby the water or other cooling liquid employed and introduced through said pipe will be delivered at the bottom of said annular chamber and will rise upward in said chamber around the milk vessel or inner chamber 6, and thereby insure that the contents of said milk vessel will be lowered in temperature to the desired degree of coolness. Designed as being complementary to the orifice 9 is the discharge-pipe 11, also in communication with the annular chamber 7 and designed to receive any excess of water and discharge the same.

In order that the chamber 6 and the walls 5 may be maintained concentrically with respect to each other and also with respect to the body portion 1, I provide the lid-section 12, to which is connected said walls 5 and the chamber 6, the latter being preferably extended above the lid 12 to receive and be covered by the closure-section 13, said closure-section being provided with the handle 14 to facilitate the ready manipulation or control thereof. The closure 13 is also provided with a ventilator 15, preferably formed of closely-meshed wire-cloth, whereby the odors and heat arising from the milk will be permitted to freely escape.

It will be understood that the chamber 6 is entirely open at its lower end, and thus communicates freely with the annular space 16, which extends between the wall 5 and the body portion 1, and said space, together with the bottom of the body-section, is adapted to receive the milk to be cooled, it being understood that the milk thus disposed will rise to its level in the chamber 6. The annular milk-chamber 16 is also ventilated by means of a suitable opening or openings 17, formed in the lid-section 12 at a proper point therein.

By the construction and arrangement of parts thus described it will be understood that water may be readily introduced into the receiving-orifice 9 and will entirely fill to overflowing the annular chamber 7, the excess of water or other cooling liquid employed being free to flow off through the discharge-pipe 11.

If preferred, a continuous stream of cold water may be provided in any preferred manner, through which will be delivered the lower end of the pipe 10 into the annular chamber 7, thereby insuring that the excess of water the temperature of which has been lowered by the heat of the milk will rise to the upper part of the chamber 7 and be taken off by the discharge-pipe 11. The body portion 1 is also protected and cooled by being received by the outer jacket or casing 18, which is also designed to be filled with cold water or ice, so as to insure that the milk-separator proper will be entirely surrounded by water, as shown in Fig. 1.

The outer jacket 18 may very readily and effectually be permanently united to the extreme lower edge of the casing 1, as by soldering or other means, whereby it will be observed that the annular space 20 is provided entirely surrounding the casing of the separator proper, while suitable handles 21 may also be connected at any desired point, preferably to the upper edge of the jacket 18. The outer jacket 18 may be readily cut away or fitted around the casing 1, so as to disclose the transparent gage 22, provided in the lower end of the body portion 1. The space thus provided in the outer jacket will also permit the jacket to be disposed upon the separator proper without in any wise interfering with the location of the faucet 3.

By the arrangement just described the milk within my improved separator will be practically entirely surrounded by water or other cooling liquid, while the annular water-chamber 7 is also disposed within the body of the milk, thereby insuring that the temperature of the milk will be quickly reduced to the desired degree of coolness and maintained at such point, and thus prevent the inception or rapid development of the souring process. If preferred, the discharge-pipe 11 may be so formed that its discharging end will take through the upper edge of the jacket 18, a suitable aperture being provided through which the free end of said pipe may be extended and properly soldered to close the leakage, as shown in Fig. 1.

While I have described the preferred combination and construction of parts deemed necessary in materializing my invention, I desire to comprehend such equivalents and substitutes as may be considered as falling fairly within the scope of my invention.

It will be understood that the various parts of my invention may be made any preferred size and shape deemed most suitable for meeting the requirements of such an appliance.

Having thus fully described the construction of my invention, it is thought that the use thereof will be obvious, though it may be stated that the milk is introduced into the chamber 6 after the removal of the closure or lid 13, and the milk will thus fill the bottom portion of the body-section 1 and rise upward in the annular chamber 16. The cooling medium, as cold water, may thus be introduced through the receiving-orifice 9 until the annular space 7 is completely filled to overflowing, or, as above stated, a continuous supply of running water may be provided, if deemed desirable. After my improved cream-separator has been charged with water and milk and the receiving-jacket 18 also filled with cold water or with a proper supply of ice separation of the milk and cream will quickly result. After the cream has been properly separated from the milk the latter may be readily withdrawn by means of the faucet 3, or the cream may be gathered after removing the lid 12 and parts connected thereto.

By providing the concentrically-disposed chamber 6 access to the cream or milk is made easy at any time, as will be desirable from time to time for affording a supply for family use without disturbing the entire contents of the separator, as would be necessary if the lid or closure section 13 were not provided.

Having thus fully described my invention, what I claim as new, and desire to secure by Letters Patent, is—

The herein-described cream separating and cooling appliance, comprising a suitable body portion 1; a lid-section for said body portion; an annular chamber; a concentrically-disposed chamber 6, the latter open at its lower end and communicating with the interior of said body portion; suitable means to introduce a cooling liquid into the annular chamber 7 and additional means to permit the escape of an excess of water and heat and odors from the milk-chambers, in combination with an exterior casing constricted at its lower end and secured to a contiguous part of the chamber 1 and having a suitable opening in one side to disclose the transparent gage and receive the faucet of said body portion and means to prevent the leakage around said faucet and the point of union of the casing 1, substantially as and for the purpose set forth.

In testimony whereof I affix my signature in presence of two witnesses.

JOHN W. WHITLOCK.

Witnesses:
J. V. HURST,
A. H. COLEMAN.